(12) United States Patent
Pavlov et al.

(10) Patent No.: US 9,900,212 B2
(45) Date of Patent: Feb. 20, 2018

(54) INSTALLATION OF AN ARBITRARY SERVER AS AN EXTENSION OF A COMPUTING PLATFORM

(71) Applicants: Vladimir Pavlov, Veliko Tarnovo (BG); Peter Matov, Sofia (BG); Radoslav Ivanov, Sofia (BG)

(72) Inventors: Vladimir Pavlov, Veliko Tarnovo (BG); Peter Matov, Sofia (BG); Radoslav Ivanov, Sofia (BG)

(73) Assignee: SAP SE, Walldorf (DE)

( * ) Notice: Subject to any disclaimer, the term of this patent is extended or adjusted under 35 U.S.C. 154(b) by 508 days.

(21) Appl. No.: 14/531,964

(22) Filed: Nov. 3, 2014

(65) Prior Publication Data

US 2016/0127177 A1    May 5, 2016

(51) Int. Cl.
*H04L 12/24* (2006.01)
*H04L 29/08* (2006.01)
*H04L 29/06* (2006.01)

(52) U.S. Cl.
CPC ........ *H04L 41/0806* (2013.01); *H04L 41/082* (2013.01); *H04L 41/0843* (2013.01); *H04L 67/02* (2013.01); *H04L 67/10* (2013.01); *H04L 67/1029* (2013.01); *H04L 67/30* (2013.01); *H04L 41/085* (2013.01); *H04L 67/42* (2013.01)

(58) Field of Classification Search
CPC ..... H04L 41/0806; H04L 67/02; H04L 67/30; H04L 67/1029; H04L 41/082; H04L 41/0843; H04L 67/10; H04L 67/42; H04L 41/085
See application file for complete search history.

(56) References Cited

U.S. PATENT DOCUMENTS

| 6,170,008 B1 * | 1/2001 | Bahlmann | G06F 9/4416 709/220 |
| 8,347,263 B1 | 1/2013 | Offer | |
| 8,387,045 B2 * | 2/2013 | Yasutaka | G06F 9/45537 705/3 |
| 9,003,406 B1 | 4/2015 | Hodge et al. | |
| 9,467,334 B2 * | 10/2016 | Whittemore | H04L 41/0806 |
| 2005/0038880 A1 * | 2/2005 | Danforth | H04L 29/06 709/222 |
| 2005/0198275 A1 | 9/2005 | D'Alo et al. | |
| 2006/0092861 A1 * | 5/2006 | Corday | H04L 41/0213 370/256 |
| 2006/0143595 A1 | 6/2006 | Dostert et al. | |
| 2006/0242626 A1 * | 10/2006 | Pham | G06F 8/61 717/121 |
| 2007/0143767 A1 * | 6/2007 | Attanasio | G06F 9/5061 718/104 |

(Continued)

*Primary Examiner* — Uzma Alam

(57) ABSTRACT

An archive file including an extension server runtime of the arbitrary server and one or more auxiliary computer modules is received. Input values of one or more configuration parameters including a number of extension server nodes to be installed are received. The archive file is extracted at a file system of the at least one server instance. The extracted extension server runtime is read by an extension server bootstrap from the one or more auxiliary modules. The number of extension server nodes as specified by the input values are installed based on the extracted extension server runtime on the at least one server instance by the extension server bootstrap.

14 Claims, 6 Drawing Sheets

(56) References Cited

U.S. PATENT DOCUMENTS

| | | | |
|---|---|---|---|
| 2009/0037894 A1 | 2/2009 | Unger | |
| 2010/0180016 A1* | 7/2010 | Bugwadia | G06F 9/4411 |
| | | | 709/220 |
| 2010/0205594 A1 | 8/2010 | Jirka | |
| 2011/0019660 A1* | 1/2011 | Kumarasamy | H04L 65/1059 |
| | | | 370/352 |
| 2011/0289508 A1 | 11/2011 | Fell et al. | |
| 2011/0299463 A1* | 12/2011 | Bachmann | H04W 8/065 |
| | | | 370/328 |
| 2013/0047150 A1 | 2/2013 | Malasky et al. | |
| 2013/0185529 A1* | 7/2013 | Acuna | H04L 67/1097 |
| | | | 711/154 |
| 2013/0204904 A1* | 8/2013 | Raffo | H04L 41/0859 |
| | | | 707/803 |
| 2016/0098253 A1* | 4/2016 | Hutzel | G06F 8/20 |
| | | | 717/109 |
| 2016/0112252 A1* | 4/2016 | Notari | H04L 41/0843 |
| | | | 709/221 |

\* cited by examiner ns of a computing platform.
INSTALLATION OF AN ARBITRARY SERVER AS AN EXTENSION OF A COMPUTING PLATFORM

BACKGROUND

Existing computing platforms are based on technologies that may rapidly become obsolete. There is demand for constant update to latest available technologies, so that new functionality and features of those technologies can be consumed. However, updating an entire computing platform to latest technology specifications may be tedious and costly. At the same time, new systems are being offered by various vendors that provide application development and runtime environments that, from the outset, may be designed based on current technologies. However, those systems may lack the functionality of the existing computing platforms.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques smart retail space are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
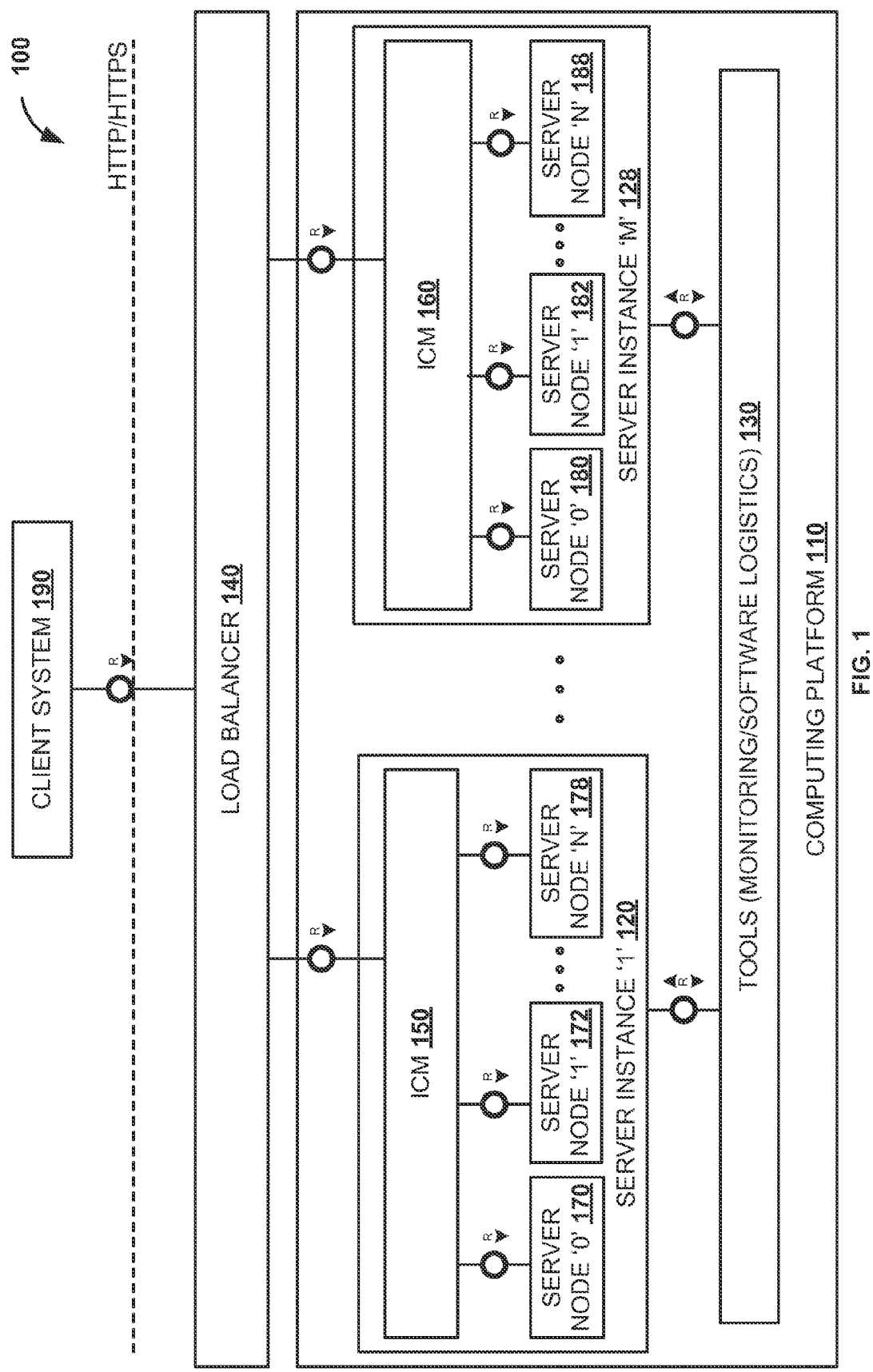
FIG. 1 illustrates a high level architecture of a cluster of server instances of a computing platform.

FIG. 1 illustrates a high level architecture 100 of a cluster of server instances of a computing platform 110. Computing platform 110 is an application and integration technology platform. Computing platform 110 may provide development and runtime environment for applications. In one embodiment, computing platform 110 may include one or more products of SAP® NetWeaver® provided by SAP SE. In another embodiment, cloud computing platform 110 may be Oracle® Fusion or other similar technology platform provided by other vendors.

Computing platform 110 may include one or more server instances such as server instance '1' 120 to server instance 'M' 128. A server instance defines a group of resources such as memory, work processes, etc., usually in support of one or more application servers nodes or database server nodes within a client-server environment. For example, server node '0' 170, server node '1' 172, and server node 'N' 178 may share the same memory areas (e.g., shared file system) at server instance '1' 120 and may be controlled by the same dispatcher process, e.g., Internet Communication Manager (ICM) 150. Similarly, node server '0' 180, server node '1' 182, and server node 'N' 188 may share the same memory areas at server instance 'M' 128 and may be controlled by the same dispatcher process, e.g., ICM 160. For the different server instances 120-128, separate directories may be defined on the operating system on which the server instance is to run; entries are created in the operating system configuration files for the server instance; communication entries may be created in the host where the server instance is to run, instance profiles for the instance may be created, etc. Instance profiles are operating system files that contain instance configuration information. Individual configuration parameters may be customized to the requirements of individual instances from server instance '1' 120 to server instance 'M' 128. In the instance profile, parameters that may be configured include, but are not limited to, runtime environment of the server instance (e.g., resources such as main memory size, shared memory, roll size); which services the instance itself provides (e.g., work processes, Java processes or server nodes); location of other services that can be used (e.g., a database host); etc.

In one embodiment, server instances 120-128 may be instances of SAP® NetWeaver Application Server. In one embodiment, server instances 120-128 may be clustered to increase capacity, scalability and reliability of computing platform 110. Server instances 120-128 may share a common configuration and load may be distributed evenly across server instances 120-128 in the cluster. A server instance from server instances 120-128 may include one or more server nodes that may also be clustered. For example, server instance '1' 120 includes server node '0' 170, server node '1' 172, server node 'N' 178. Similarly, server instance 'M' 128 includes server node '0' 180, server node '1' 182, and server node 'N' 188. In one aspect, server nodes installed and running within instances may be Java processes. Tools 130 may be software for handling monitoring or software logistics of instances 120-128. For example, instances 120-128 may be started, stopped, updated, upgraded, etc., by tools 130. In one embodiment, tools 130 may include a startup framework that starts, stops, and monitors the cluster of instances 120-128.

Load balancer 140 balances the load to ensure an even distribution across instances 120-128. In one embodiment, load balancer 140 may permit communication between instances 120-128 and the Internet. Load balancer 140 may be the entry point for Hypertext Transfer Protocol (HTTP) requests to instances 120-128. Load balancer 140 can reject or accept connections. When it accepts a connection, load balancer 140 distributes the request among instances 120-128 to balance respective workload. Load balancer 140 can reject requests based on Uniform Resource Locators (URLs) that are defined to be filtered. Load balancer 140, therefore, can restrict access to computing platform 110. Thus, load balancer 140 adds an additional security check and also balances load in cloud computing platform 110. In one embodiment, load balancer 140 may be SAP® Web Dispatcher.

In one embodiment, Internet communication managers (ICMs) 150-160 permit communication between servers within instance '1' 120 and instance 'M' 128, respectively, and other external systems such as client system 190 via the protocol HTTP, Hypertext Transfer Protocol Secure (HTTPS) and Simple Mail Transfer Protocol (SMTP). For example, ICM 150 permits communication between server node '0' 170, server node '1' 172, and server node 'N' 178 and the Internet. Similarly, ICM 160 permits communication between server node '0' 180, server node '1' 182, and server node 'N' 188 and the Internet. ICM 150 and ICM 160 are separate processes monitored by load balancer 140. In one embodiment, ICM 150 distributes incoming requests directly to one of servers 170-178. Similarly, ICM 160 distributes incoming requests directly to one of servers 180-188.

Various vendors may provide different application development and runtime environments. For example, various Java Platform Enterprise Edition (EE) compliant servers may be offered by different providers that may be designed based on more current technologies. However, those application development and runtime environments may lack the functionality of computing platforms already existing such as computing platform 110. In one embodiment, one or more arbitrary servers are installed as one or more extensions of instances 120-128 of computing platform 110. The arbitrary server may be an application server. In one embodiment, the arbitrary server may be a Java server such as Java EE Web-profile server.

Figure 2:
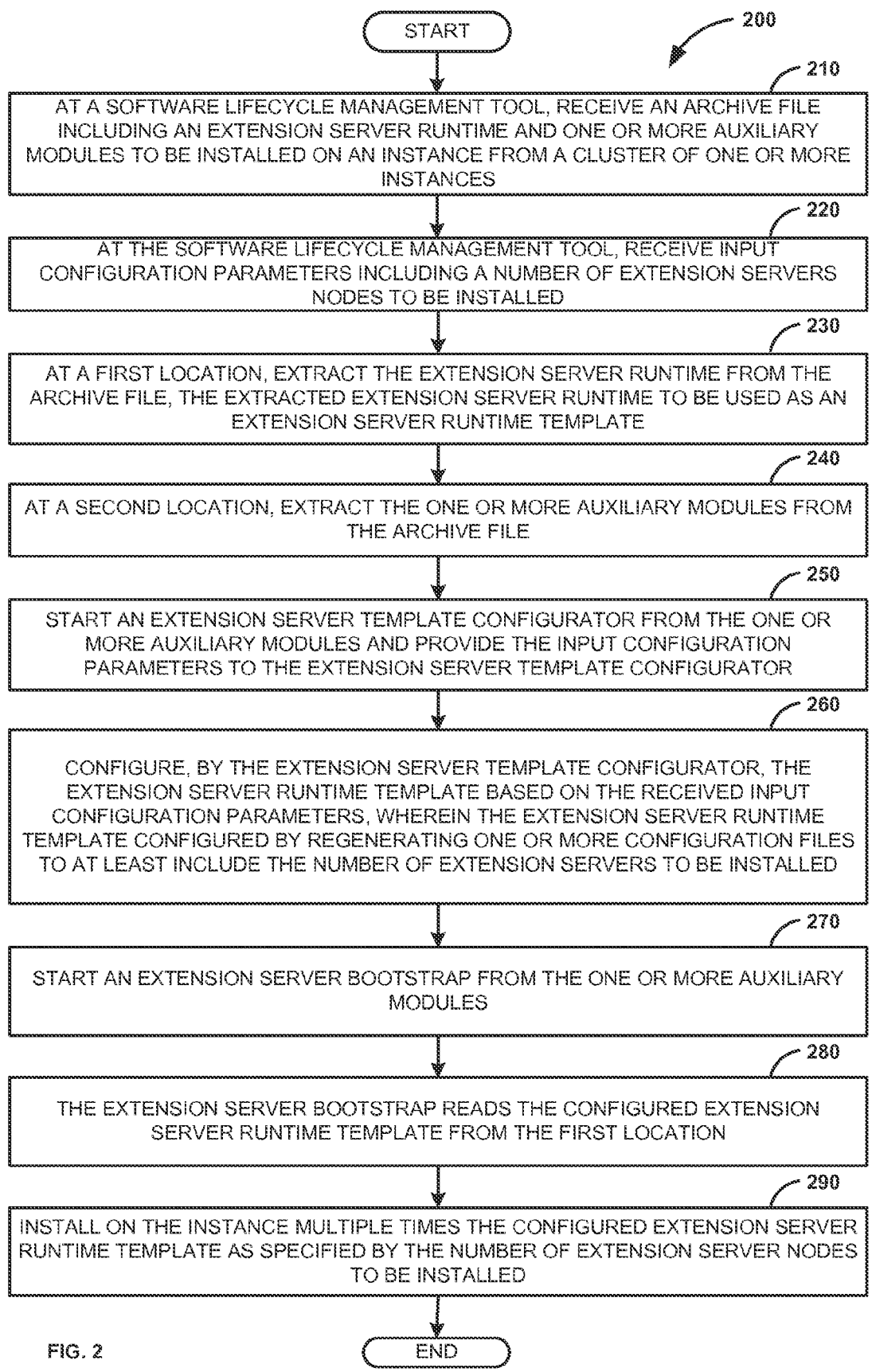
FIG. 2 illustrates a process to install one or more arbitrary servers as one or more extension server nodes of a server instance of a cloud computing platform, according to one embodiment.

FIG. 2 illustrates process 200 to install one or more arbitrary servers as one or more extension server nodes of a server instance of a cloud computing platform, according to one embodiment. At 210, an archive file including an extension server runtime and one or more auxiliary modules is received at a software lifecycle management tool. The extension server runtime and the one or more auxiliary modules to be installed on a server instance of a cloud computing platform. The extension server runtime included in the archive may be a version that is provided to a number of customers, according to one embodiment. Customers may later further configure the provided extension server runtime. Examples of an extension server runtime include, but are not limited to, Apache TomEE, Apache Tomcat, Virgo, etc.

In one embodiment, the extension server runtime and the one or more auxiliary modules may be installed on one or more server instances (e.g., server instances 120-128 in FIG. 1) in a cluster of server instances of the cloud computing platform (e.g., cloud computing platform 110 in FIG. 1). The archive file may be of various formats including, but not limited to, ZIP, RAR, Web application Archive (WAR), Java Archive (JAR), Sap Archive (SAR), Software Deployment Archives (SDA) and any other proprietary or non-proprietary archive files. In one embodiment, the software lifecycle management tool may be SAP® Software Update Manager. In various embodiments, various software lifecycle management tools may be used provided by same or different providers. In other embodiments, installation may be performed by a batch file or other script file instead of by a software lifecycle management tool.

At 220, input configuration parameters are received at the software lifecycle management tool. The input configuration parameters may include, but are not limited to, a number of extension server nodes to be installed on the server instance and other configurations for the extension server nodes to be installed such as memory size, heap size, ports, log formats to used, etc. In one embodiment, a user may specify the number of extension server nodes to be provisioned in a server instance of the cluster of server instances of the cloud computing platform. At 230, the extension server runtime is extracted from the archive file at a first location at a central file system of the cluster of server instances. The extracted extension server runtime to be used and referenced as an extension server runtime template. The number of extension server nodes to be installed based on the extension server runtime template persisted at the first location at the central file system. At 240, the one or more auxiliary modules are extracted at a second location at the central file system of the cluster of server instances. The one or more auxiliary modules support installation and update processes of the number of extension server nodes. In one embodiment, instead of extracting the archive to one or more locations at the central file system of the cluster, the content of the archive file may be persisted in a database.

At 250, an extension server template configurator from the one or more auxiliary modules is started. The input configuration parameters are provided as input to the template configurator. At 260, the extension server runtime template is configured by the extension server runtime template configurator, according to one embodiment. The extension server runtime template configured based on the received input configuration parameters. In one embodiment, the extension server runtime template is configured by regenerating or otherwise modifying one or more configuration files to at least include the number and type of extension server nodes to be installed. Further, the one or more configuration files may be modified to include an extension server bootstrap. The extension server bootstrap is an auxiliary module from the one or more auxiliary modules received with the archive file. At 270, the extension server bootstrap is started. In one embodiment, the extension server bootstrap synchronizes required binaries for the extension server nodes from the first location including the extension server runtime template with a file system of each server node from cluster. The first location stores the current or up-to-date executable files and properties to be distributed to the extension server nodes when starting the extension server nodes from their corresponding file systems. In one embodiment, synchronization of the first location with the file system of each server node in the server instance may be necessary as class loading in the Java environment is performed from the file system of the corresponding server nodes. At 280, the extension server bootstrap process reads from the first location the configured extension server runtime template and the corresponding regenerated one or more configuration files. At 290, the configured extension server runtime template is installed on the server instance multiple times as specified by the number of extension server nodes to be installed. Copies of the configured extension runtime template are created that when started act as work processes in the server instance. In one embodiment, the installed extension server nodes may be Java processes.

Figure 3:
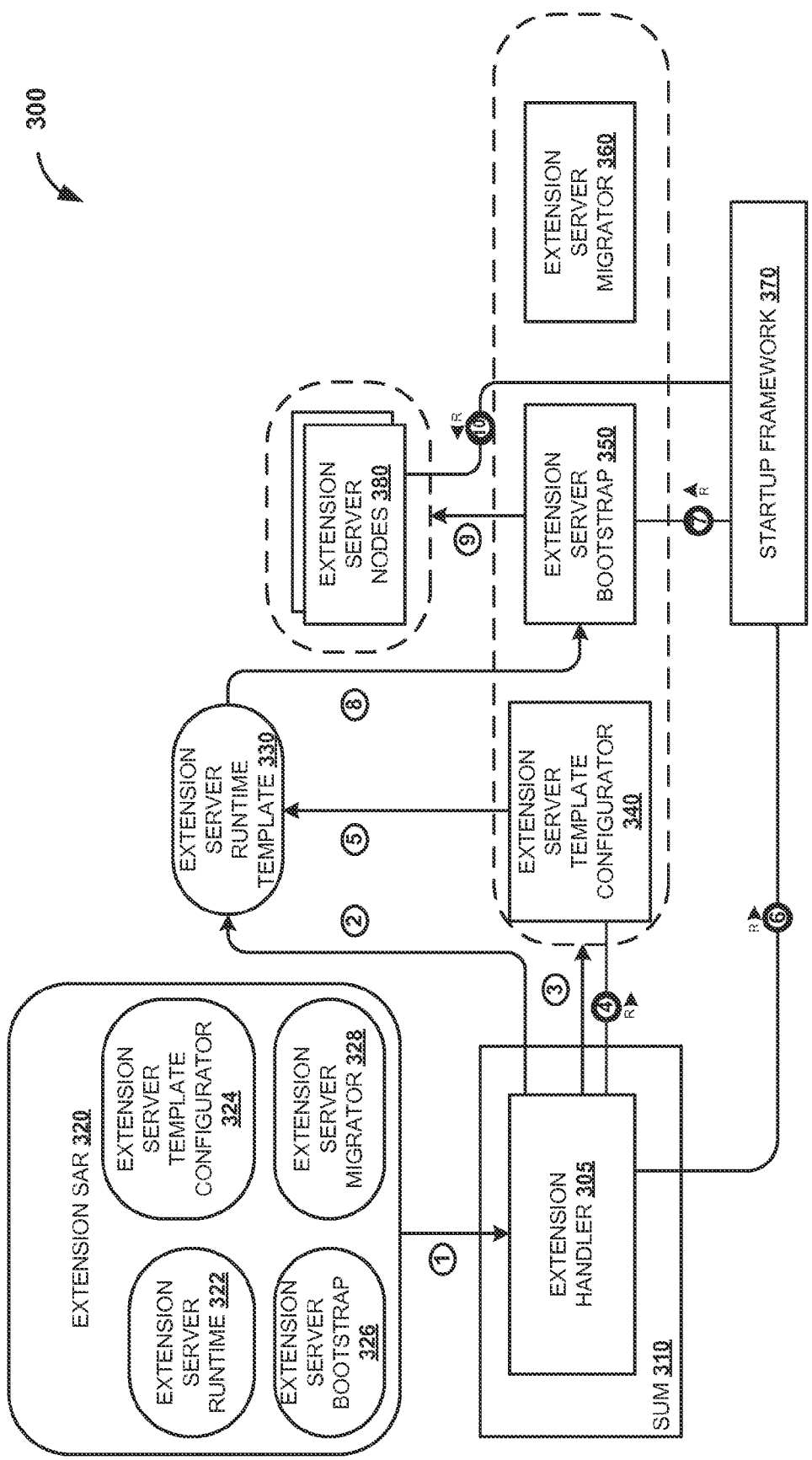
FIG. 3 illustrates exemplary system architecture to install one or more arbitrary servers as one or more extension server nodes of a server instance of a cloud computing platform, according to one embodiment.

FIG. 3 illustrates exemplary system architecture 300 to install one or more arbitrary servers as one or more extension server nodes of a server instance of a cloud computing platform, according to one embodiment. Software update manager (SUM) 310 may include handlers that perform various operations such as installations. In one embodiment, an extension handler 305 is implemented to install the one or more arbitrary servers to one or more server instance of a cluster of server instances of a cloud computing platform. Extension handler 305 receives as input configuration parameters a location from where to read extension SAR 320, a number of extension server nodes to be installed, and other configuration parameters. Extension SAR 320 is an archive file that includes executable files of the extension server to be installed and of other one or more auxiliary modules. For example, extension SAR 320 includes extension server runtime 322 and extension server template configurator 324, extension server bootstrap 326, and extension server migrator 328. Extension handler 305 reads extension SAR 320 from the location specified by the input parameters (e.g., step 1). Upon reading extension SAR 320, extension handler 305 extracts the extension server runtime 322 to a first location at the file system of the server instance, where extension server nodes to be installed (e.g., step 2). For example, extension server runtime template 330 represents extracted extension server runtime 322 from extension SAR 320. Extension server runtime template 330 to be used as base or template for installations of the extension server nodes 380. Extension handler 305 further extracts extension server template configurator 324, extension server bootstrap 326, and extension server migrator 328 to a second location at the file system of the server instance (e.g., step 3). Extension server template configurator 340 represents extracted extension server template configurator 324, extension server bootstrap 350 represents extracted extension server bootstrap 326, and extension server migrator 360 represents extracted extension server migrator 328. In one embodiment, extension handler 305 starts extension server template configurator 340 and provides the configuration parameters to the started extension server template configurator 340 (e.g., step 4).

In one embodiment, an instance properties file of a server instance may include sections including various parameters for the server nodes of the server instance. Thus, server nodes installed in the server instance may be described in the instance properties file generated for the corresponding server instance. The instance properties file include settings or properties that apply to the server instance as a whole. The descriptions of server nodes specified in the instance properties file may include, but are not limited to, locations or paths to folders of the server nodes where, for example, binary or other executable files of the server nodes are stored; names and identifiers of the server nodes; consecutive numbers and types of the server nodes such as type server, dispatcher, bootstrap, unknown, etc. The instance properties file may be stored within the file system of each server instance. The instance properties file may be used by the bootstrap when synchronizing required binaries for the server nodes from a central location or the database and a local file system of the different server nodes in the server instance. In the Java environment this may be necessary since class loading is performed using the file system.

Extension server template configurator 340 configures the extension server runtime template 330 based on the configuration parameters received at extension handler 305 (e.g., step 5). In one embodiment, the extension server runtime template 330 is configured by regenerating or otherwise modifying one or more configuration files to at least include the number of extension server nodes to be installed. For example, the instance properties file may be modified to include the number of extension server nodes to be installed (e.g., extension server nodes 380). Further, the instance profile file may be modified to include description for extension server bootstrap 350 and extension server migrator 360 to be started by startup framework 370. In one embodiment, the instance profile refers to the instance properties file that specifies the number of extension server nodes to be installed. Server instances (e.g., server instances '1' 120 and 'M' 128 in FIG. 1) in a cluster of server instances may be started, stopped, and monitored using a startup framework such as startup framework 370. Startup framework 370 for a server instance may provide centralized management of server nodes in the server instance such as server nodes 170-178 and servers nodes 180-188 (in FIG. 1). Startup framework 370 may monitor life cycle of the server nodes within the server instance. Further, startup framework 370 may manage and monitor ICM processes within the server instance. In case of cluster server node failure, the framework automatically restarts the corresponding server node. The startup framework may serve as a single point of administration for starting, restarting, stopping, and monitoring of the server nodes. Startup framework 370 may display trace files, system environment of each instance, and system environment of the computing platform.

Once, extension server template configurator 340 configures extension server runtime template 330, extension handler 305 starts startup framework 370 (e.g., step 6). Based on the modified instance profile file, startup framework 370 starts extension server bootstrap 350 (e.g., step 7). Extension server bootstrap 350 reads the configured extension server runtime template 330 (e.g., step 8). Upon reading extension server runtime template 330, extension server bootstrap 350 installs extension serve nodes 380 by multiplying the configured extension server runtime template 330 on the server instance (e.g., step 9). The configured extension server runtime template 330 is multiplied a number of times as specified by the parameter indicating the number of extension server nodes. Once, extension server bootstrap 350 successfully finishes with installation of extension server nodes 380, startup framework 370 starts the installed one or more extension server nodes 380 (e.g., step 10). In one embodiment, startup framework 370 may start the one or more extension server nodes 380 by restarting the whole server instance. Extension server nodes 380 when started act as work processes in the server instance. In one embodiment, the installed extension server nodes 380 may be Java processes.

Once steps from 1 to 10 in FIG. 3 are completed, one or more extension server nodes 380 are installed. The installed one or more extension server nodes 380 may be of a first version and may be based on a first set of input values of configuration parameters. In one embodiment, extension server nodes 380 may be upgraded.

Figure 4:
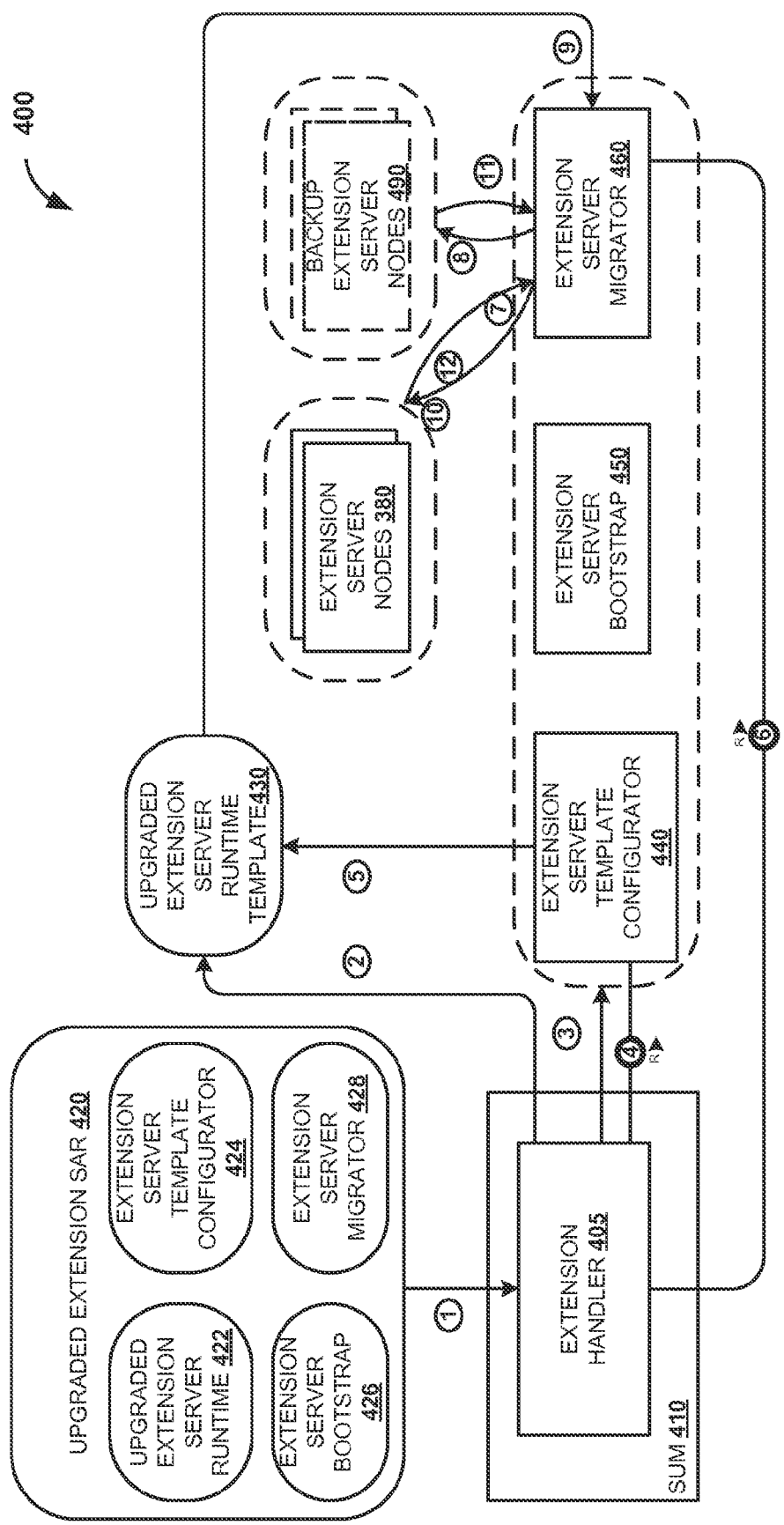
FIG. 4 illustrates exemplary system architecture to upgrade one or more extension server nodes installed on a server instance of a cloud computing platform, according to one embodiment.

FIG. 4 illustrates exemplary system architecture 400 to upgrade one or more extension server nodes 380 installed on a server instance of a cloud computing platform, according to one embodiment. Extension handler 305, running at SUM 410, receives input values for configuration parameters including, but not limited to, a location from where to read upgraded extension SAR 420, a number of upgraded extension server nodes to be installed, and values of other configuration parameters (e.g., step 1). Upgraded extension SAR 420 is an archive file that includes executable files of a second version, e.g., upgraded or updated version, of the extension servers to be upgraded and executable files of other one or more auxiliary modules. For example, upgraded extension SAR 420 may include a second version of extension server runtime 322. Upgraded extension server runtime 422 may represent an upgraded version of extension server runtime 322 in FIG. 3. In various embodiments, upgraded extension SAR 420 may also include a second version of at least one of extension server template configurator 324, extension server bootstrap 326, and extension server migrator 328. For example, upgraded extension SAR 320 includes extension server template configurator 424, extension server bootstrap 426, and extension server migrator 428 that may be an upgraded version of extension server template configurator 324, extension server bootstrap 326, and extension server migrator 328, respectively.

Extension handler 405 reads upgraded extension SAR 420 from the location specified by the input parameters (e.g., step 1). Upon reading upgraded extension SAR 420, extension handler 305 extracts upgraded extension server runtime 422 to a first location at the file system of the server instance, where extension server nodes to be installed (e.g., step 2). For example, upgraded extension server runtime template 430 represents extracted upgraded extension server runtime 422 from upgraded extension SAR 420. Upgraded extension server runtime template 430 to be used as base or template for upgrade of extension server nodes 380. Extension handler 405 further extracts extension server template configurator 424, extension server bootstrap 426, and extension server migrator 428 to a second location at the file system of the server instance (e.g., step 3). Extension server template configurator 440 represents extracted extension server template configurator 424, extension server bootstrap 450 represents extracted extension server bootstrap 426, and extension server migrator 460 represents extracted extension server migrator 428. In one embodiment, extension handler 405 starts extension server template configurator 440 and provides the configuration parameters to the started extension server template configurator 440 (e.g., step 4). In one embodiment, extension server template configurator 440 configures upgraded extension server runtime template 430 based on input configuration parameters received at extension handler 405 (e.g., step 5).

Once, upgraded extension server runtime template 430 is configured, extension handler 405 starts extension server migrator 460 (e.g., step 6) to migrate custom configurations of the first version of extension server nodes 380. Extension server migrator 460 reads extension server nodes 380 from the file system (e.g., step 7) and copy extension server nodes 380 as backup extension server nodes 490 (e.g., step 8). Thus, extension server migrator 460 backs up existing extension server nodes 380 and corresponding instance properties file that include the first set of input values of the configuration parameters. Once, extension server nodes 380 are backed up, extension server migrator 460 reads the configured upgraded extension server runtime template 430 (e.g., step 9). Upon reading upgraded extension server runtime template 430, extension server migrator 460 upgrades extension server nodes 380 by multiplying the configured upgraded extension server runtime template 430 by overriding previous version of extension server nodes 380 (e.g., step 10). Extension server migrator 460 reads from backup extension server nodes 490 (e.g., step 11). In one embodiment, information included in the backup extension server nodes 490 to be migrated to the upgraded extension server nodes 380. For example, applications and applications' data deployed on first version of extension server nodes 380 are read from backup extension server nodes 490 by extension server migrator 460. The read applications and applications' data are migrated to the upgraded extension server nodes 380 by extension server migrator 460 (e.g., step 12). In one embodiment, at step 11, extension server migrator 460 may read configuration parameter values from backup extension server nodes 490). For example, extension server migrator 460 may read instance properties file of backup extension server nodes 490. Extension server migrator 460 identifies in the instance properties file custom configuration parameter values from the first version of the server nodes. Custom configuration parameter values may be values of the configuration parameters customized by one or more customers based on specific demands by the one or more clients. In one embodiment, configuration parameter with customized values may be marked. Alternatively, custom configuration parameter values may include in a separate file. The identified custom configuration parameters values to be migrated to upgraded extension server nodes 380 by extension server migrator 460. Extension server migrator 460 reconfigures upgraded extension server nodes 380 by regenerating the instance properties file of the upgraded extension server nodes 380 to include the identified custom configuration parameters in the instance properties file of the first version of extension server nodes 380. Thus, an instance properties file is regenerated for upgraded extension server nodes 380 by retaining custom configuration parameters of the prior version of the extension server nodes 380. Thus, custom configuration initially set for extension servers are kept when the extension servers are upgraded. The instance properties file of the upgraded extension server nodes 380 is added to the instance profile file for the server instance, so that upon start of the server instance, the upgraded extension server nodes 380 will be started as well along with traditional server nodes already existing in the server instance. In one embodiment, upon the upgraded extension server nodes may be tested and validated. Upon successful validation of the upgrade, extension server template configurator 440 may remove extension server runtime template 330 from the file system. Otherwise, upon unsuccessful upgrade, extension server template configurator 440 may rollback the first version of the extension server runtime template 330.

Figure 5:
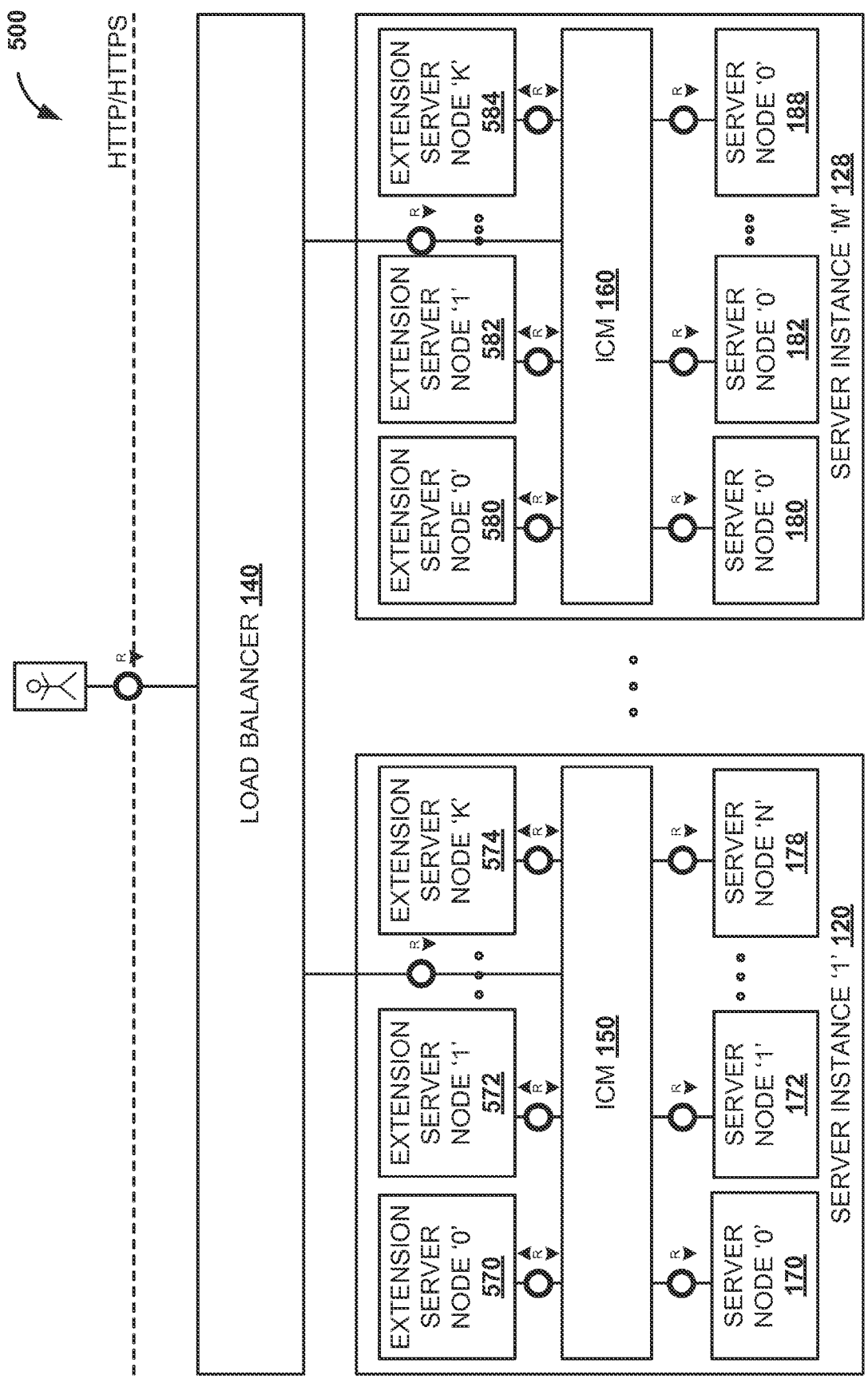
FIG. 5 illustrates exemplary system architecture where one or more extension server nodes are installed within one or more server instances of a cluster of server instances, according to one embodiment.

FIG. 5 illustrates exemplary system architecture 500 where one or more extension server nodes are installed within one or more server instances of a cluster of server instances, according to one embodiment. In FIG. 1, an exemplary cluster of server instances is illustrated such as cluster of server instances 120-128 with installed server nodes 170-178 and server nodes 180-188, respectively. According to process 200, an arbitrary server may be installed a number of times as extension server nodes in the server instances 120-128. For example, extension server node '0' 570, extension server node '1' 572, and extension server node 'K' 574 represent an arbitrary server installed 'k' number of times in server instance '1' 120. Also, extension server node '0' 580, extension server node '1' 582, and extension server node 'K' 584 represent the arbitrary server installed 'k' number of times in server instance 'M' 128. Extension server nodes 570-574 are provisioned in the file system of server instance '1' 120. In one embodiment, when started, extension server nodes 570-574 may be running as individual processes with server instance '1' 120. Similarly, extension server nodes 580-584 are provisioned in the file system of server instance 'M' 128. In one embodiment, when started, extension server nodes 580-584 may be running as individual processes with server instance 'M' 128. In one embodiment, by installing one or more Java EE extension server nodes in one or more application server Java instances, one or more Java EE 6 Web-Profile processes may be provisioned and configured in the one or more application server Java instances.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as Compact Discs Read-Only Memory (CD-ROMs), Digital Video Discs (DVDs) and holographic devices; magneto-optical media; and hardware devices that are specially configured to store and execute, such as application-specific integrated circuits ("ASICs"), programmable logic devices ("PLDs") and Read-only memory (ROM) and Random-access memory (RAM) devices, memory cards used for portable devices such as Secure Digital (SD) cards. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
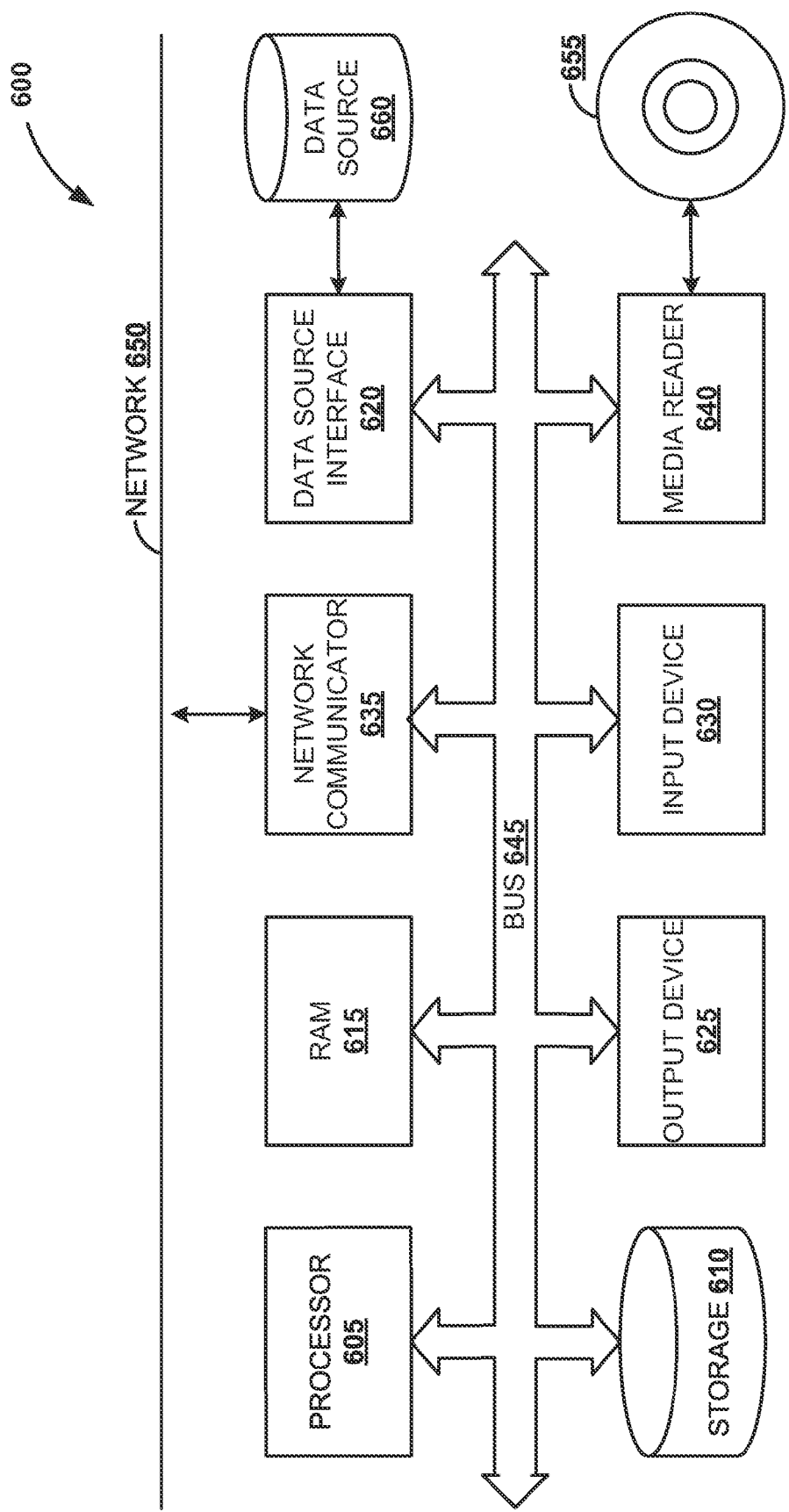
FIG. 6 illustrates an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. These output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to install and update an arbitrary server as one or more extension server nodes on at least one server instance in a cluster of server instances, the method comprising:
receiving an archive file including an extension server runtime of the arbitrary server and one or more auxiliary computer modules to be installed on the at least one server instance from the cluster of server instances, wherein the one or more auxiliary computer modules include an extension server template configurator and an extension server bootstrap;
receiving input values of one or more configuration parameters including a number of extension server nodes to be installed;
extracting the extension server runtime from the archive file to a first location at a file system of the at least one server instance;
extracting the extension server template configurator and the extension server bootstrap to a second location at the file system of the at least one server instance;
configuring the extracted extension server runtime through starting the extracted extension server template configurator with the input values of the one or more configuration parameters;
reading the configured extracted extension server runtime by the extension server bootstrap from the one or more auxiliary computer modules;
the extension server bootstrap, providing the configured extracted extension server runtime for multiple installations on the at least one server instance to multiple extension server nodes of the number of extension server nodes;
installing the configured extracted extension server runtime on the at least one server instance to the multiple extension server nodes;
receiving upgrade input values of upgrade configuration parameters including a location of an upgraded extension archive, wherein the upgrade extension archive includes an upgraded extension server runtime, an upgraded version of the extension server template configurator, and an upgraded version of an extension server migrator, wherein the upgrade input values are associated with upgrading the multiple extension server nodes;
extracting and configuring, by the upgraded version of the extension server template configurator, an upgraded extension server runtime template based on the received upgrade input values; and
upgrading, by the upgraded version of the extension server migrator, the multiple extension server nodes based on the configured upgraded extension server runtime template by overriding a previous version of the multiple extension server nodes, wherein upgrading includes migrating applications and applications' data from the previous version of the multiple extension server nodes to the upgraded extension server nodes.

2. The method of claim 1 further comprising:
starting the multiple extension server nodes installed on the at least one server instance, and
upon starting the multiple extension server nodes, provisioning the extension server nodes as an individual process within the at least one server instance.

3. The method of claim 1 further comprising:
regenerating a first configuration file to at least include the number of extension server nodes to be installed.

4. The method of claim 1 further comprising:
regenerating a second configuration file to at least include the one or more auxiliary computer modules to be started once extracted from the archive file.

5. The method of claim 1, further comprising:
reading the number of extension server nodes by the upgraded version of the extension server migrator;
backing up the number of extension server nodes;
reading custom data from the number of backed up extension server nodes; and
applying the custom data to the upgraded extension server nodes.

6. The system of claim 1, wherein the operations further comprise:
starting the multiple extension server nodes installed on the at least one server instance, and
upon starting the multiple extension server nodes, provisioning the extension server nodes as individual Java process within the at least one server instance.

7. A computer system to install and upgrade an arbitrary server as one or more extension server nodes on at least one server instance in a cluster of server instances, the system comprising:
a memory to store computer executable instructions;
at least one computer processor coupled to the memory to execute the instructions, to perform operations comprising:
receiving, at a software management tool, an archive file including an extension server runtime of the arbitrary server and one or more auxiliary computer modules to be installed on the at least one server instance from the cluster of server instances, wherein the one or more auxiliary computer modules include an extension server template configurator and an extension server bootstrap;
receiving, at a software management tool, input values of one or more configuration parameters including a number of extension server nodes to be installed;
extracting the extension server runtime from the archive file to a first location at a file system of the at least one server instance;
extracting the extension server template configurator and the extension server bootstrap to a second location at the file system of the at least one server instance;
configuring the extracted extension server runtime through starting the extracted extension server template configurator with the input values of the one or more configuration parameters;
reading the configured extracted extension server runtime by the extension server bootstrap from the one or more auxiliary computer modules;
the extension server bootstrap, providing the configured extracted extension server runtime for multiple installations on the at least one server instance to multiple extension server nodes of the number of extension server nodes;
installing the configured extracted extension server runtime on the at least one server instance to the multiple extension server nodes;
receiving upgrade input values of upgrade configuration parameters including a location of an upgraded extension archive, wherein the upgrade extension archive includes an upgraded extension server runtime, an upgraded version of the extension server template configurator, and an upgraded version of an extension server migrator, wherein the upgrade input values are associated with upgrading the multiple extension server nodes;

extracting and configuring, by the upgraded version of the extension server template configurator, an upgraded extension server runtime template based on the received upgrade input values; and upgrading, by the upgraded version of the extension server migrator, the multiple extension server nodes based on the configured upgraded extension server runtime template by overriding a previous version of the multiple extension server nodes, wherein upgrading includes migrating applications and applications' data from the previous version of the multiple extension server nodes to the upgraded extension server nodes.

8. The system of claim 7, wherein the operations further comprise:

regenerating a first configuration file to at least include the number of extension server nodes to be installed, and regenerating a second configuration file to at least include the one or more auxiliary computer modules to be started once extracted from the archive file.

9. The system of claim 7, wherein the operations further comprise:

reading the number of extension server nodes by the upgraded version of the extension server migrator;

backing up the number of extension server nodes;

reading custom data from the number of backed up extension server nodes; and applying the custom data to the upgraded extension server nodes.

10. A non-transitory computer readable medium storing instructions thereon, which when executed by a processor cause a computer system to:

receive, at a software management tool, an archive file including an extension server runtime of an arbitrary server and one or more auxiliary computer modules to be installed on at least one server instance from a cluster of server instances, wherein the one or more auxiliary computer modules include an extension server template configurator and an extension server bootstrap;

receive, at a software management tool, input values of one or more configuration parameters including a number of extension server nodes to be installed;

extract the extension server runtime from the archive file to a first location at a file system of the at least one server instance;

extract the extension server template configurator and the extension server bootstrap to a second location at the file system of the at least one server instance;

configure the extracted extension server runtime through starting the extracted server template configurator with the input values of the one or more configuration parameters;

read the configured extracted extension server runtime by the extension server bootstrap from the one or more auxiliary computer modules;

the extension server bootstrap, provide the configured extracted extension server runtime for multiple installations on the at least one server instance to multiple extension server nodes of the number of extension server nodes;

install the configured extracted extension server runtime on the at least one server instance to the multiple extension server nodes;

receive upgrade input values of upgrade configuration parameters including a location of an upgraded extension archive, wherein the upgrade extension archive includes an upgraded extension server runtime, an upgraded version of the extension server template configurator, and an upgraded version of an extension server migrator, wherein the upgrade input values are associated with upgrading the multiple extension server nodes;

extract and configure, by the upgraded version of the extension server template configurator, an upgraded extension server runtime template based on the received upgrade input values; and upgrade, by the upgraded version of the extension server migrator, the multiple extension server nodes based on the configured upgraded extension server runtime template by overriding a previous version of the multiple extension server nodes, wherein upgrading includes migrating applications and applications' data from the previous version of the multiple extension server nodes to the upgraded extension server nodes.

11. The computer readable medium of claim 10, wherein the instructions when executed by the processor cause the computer system further to:

start the multiple extension server nodes installed on the at least one server instance, and upon starting the multiple extension server nodes, provision the extension server nodes as individual Java process within the at least one server instance.

12. The computer readable medium of claim 10, wherein the instructions when executed by the processor cause the computer system further to:

regenerate a first configuration file to at least include the number of extension server nodes to be installed.

13. The computer readable medium of claim 10, wherein the instructions when executed by the processor cause the computer system further to:

regenerate a second configuration file to at least include the one or more auxiliary computer modules to be started once extracted from the archive file.

14. The computer readable medium of claim 10, wherein the instructions when executed by the processor cause the computer system further to:

read the number of extension server nodes by the upgraded version of the extension server migrator;

back up the number of extension server nodes;

read custom data from the number of backed up extension server nodes; and apply the custom data to the upgraded extension server nodes.

* * * * *